Figure 1:
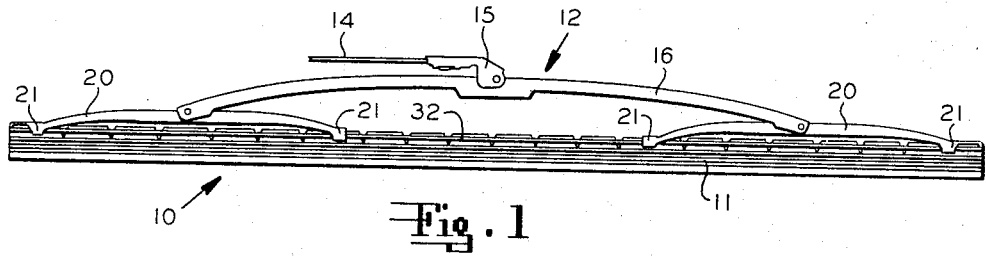

July 4, 1967  J. W. ANDERSON  3,328,825
WINDSHIELD WIPER BLADE
Filed March 5, 1965

INVENTOR.
JOHN W. ANDERSON
BY
*Kenneth E. Walden*
ATTORNEY

United States Patent Office 3,328,825
Patented July 4, 1967

3,328,825
WINDSHIELD WIPER BLADE
John W. Anderson, 405 S. Huntington St.,
Gary, Ind. 46403
Filed Mar. 5, 1965, Ser. No. 437,535
2 Claims. (Cl. 15—250.36)

This invention relates to a windshield wiper and is particularly directed to the blade.

Windshields which are flat have, in addition to their generally planar surfaces, minor irregularities (hills and valleys) which deviate from a true plane. Likewise, windshields which are curved have similar immediate irregularities which vary from the general curvature. Difficulty is encountered in wiping a windshield surface having the above-referred to irregularities because it is difficult for the blade or wiping element to readily conform in wiping contact to such surface variations.

An object of this invention is to provide an improved blade or wiping member of a windshield wiper.

Another object of this invention is to provide an improved blade easily conformable to an irregular or curved surface, and adapted to distribute pressure applied thereto evenly throughout the length of the blade.

Other objects and advantages of this invention will become apparent after the description hereinafter set forth is considered in conjunction with the drawing annexed hereto.

Figures 2, 3:
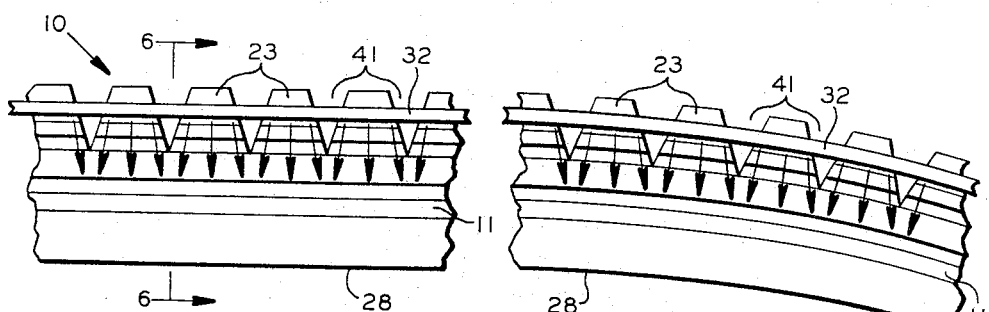
Figure 4:
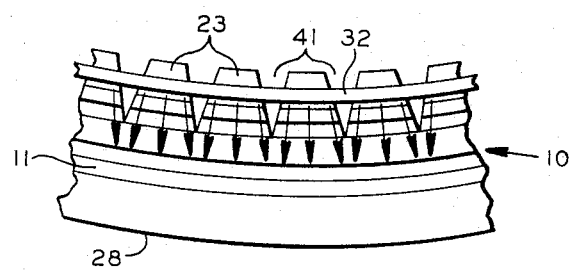
Figure 5:
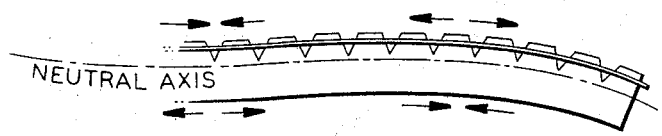
Figure 6:
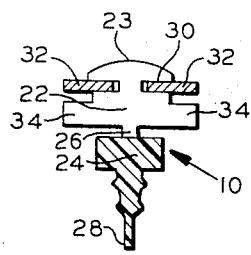

In the drawing:

FIGURE 1 is a side elevation of a windshield wiper;
FIGURE 2 is an enlarged side view of the wiping blade;
FIGURE 3 is an enlarged side view of the wiping blade deflected to wipe a convex surface;
FIGURE 4 is an enlarged side view of the wiping blade deflected to wipe a concave surface;
FIGURE 5 is a representation of a blade according to this invention deformed to an irregular or curved surface and showing tensile and compressive forces acting on either side of the neutral axis;
FIGURE 6 is a sectional view of FIGURE 2 taken along line 6—6.

FIGURE 1 shows a windshield wiper having an elongate wiping blade, generally designated by the numeral 10, supported on a superstructure 12. The superstructure is carried at the outer end of a spring urged windshield wiper arm 14, and is adapted to receive force from the arm and to transmit that force to spaced apart locations along the length of the blade. For this purpose, superstructure 12 is comprised of a primary yoke 16 having an arm connector 15 near its mid-point and pivotally carrying secondary yokes 20 at its opposite ends. In turn, opposite ends of each secondary yoke are adapted for operatively carrying wiping blade 10 which includes wiping member 11.

The resilient wiping member, elongate in form, is provided with a wiping portion 24 and a back portion 22 (as shown in FIGURE 6). These portions are connected by hinge 26 which extends throughout their length permitting layover of the wiping portion relative to the back portion for effective wiping action. The lower extremity of the wiping portion 24 terminates in a wiping edge 28 for contacting a windshield surface. Back portion 22 is provided with a series of notches 41 spaced throughout the length of the wiping member, thereby defining a vertebra-like or serrated back portion. These vertebra portions are designated by the numeral 23.

In the embodiment shown in the drawing, the vertebra portions are in the form of a row of truncated pyramids with contiguous bases, which bases are in a plane substantially coincident with the neutral axis (see FIGURE 5).

Longitudinal grooves 30 (see FIGURE 6) along the opposite sides of each vertebra 23 define a pair of linear grooves which extend generally throughout the length of the wiping member for receiving sides of a flexor or elongate support means 32.

Flexor 32, normally constructed of flexible steel, is planar and has a pair of generally parallel side portions which may be separate or connected at their extremities. Flexor 32 has generally uninterrupted parallel inner edges extending substantially throughout its length, which edges are adjacent the inner sides of grooves 30. The flexor, being flexible in one plane and relatively inflexible in a plane transverse to the first plane, and carried by the wiping member (as shown in FIGURE 6), restricts movement of the blade generally to a plane passing through the vertical axis of wiping portion 24.

Lateral protrusions 34 of wiping member 11 underlie outer edges of flexor 32 for protecting the windshield in the event of excessive layover of the wiping member. Metal to glass contact is prevented.

Opposite ends of secondary yokes 20 include claws 21 which receive outer edges of flexor 32 in slidable relation therewith. Arm pressure exerted on the secondary yokes through primary yoke 16 is transmitted to blade 10.

As wiping blade 10 is flexed into conformity with an ever-changing surface, energy is required to alternately compress and extend the resilient wiping member on either side of its neutral axis (see FIGURE 5). It has been found that notches or recesses provided in back portion 22 on one side of the neutral axis aid materially in conforming the blade to the surface of a curved windshield, including the above-referred to irregularities which exist on all windshields whether curved or flat.

An advantageous amount of material removed by recesses 41 in back portion 22 may vary over an extended range. Under conditions of tension only on the back portion, transverse slits therein would be sufficient to relieve stress above the neutral plane.

The removal of the material of recess 41 does not adversely affect the stability of back portion 22. In windshield wipers of the prior art, pressure is applied to a flexor at spaced locations, and the flexor in turn transmits pressure substantially evenly to the wiping blade throughout its length. Herein the vertebra-like configurations 23 of back portion 22 remaining between notches 41 have broad base portions lying adjacent one another. They may vary in size and shape, but their base is broad when compared to upper extremities. Pressure is thereby more evenly distributed. As shown by the arrows applied to FIGURES 2, 3 and 4, pressure applied downwardly by flexor 32 is spread substantially evenly along these bases to wiping portion 24 which urges wiping lip 28 into contact with the glass.

FIGURES 3 and 4 show the blade flexed to convex and concave surfaces, respectively. The force to overcome the compressive and tensile resistance of back portion 22 about flexor 32 is substantially reduced by reason of notches 41. Vertebra 23 are easily distorted by the flexor or they can easily creep or slide thereon to more readily accommodate flexing of the wiping portion of the blade. Under conditions where a curvature is encountered, as in usual practice, the same facility for creeping would then again assist in facilitating conformity of the wiping edge to the glass.

By minor variations in the cross-sectional dimensions of the wiping element (in vertical cross sections taken through back portion 22), there is established readily a responsiveness of the wiping element adapted to the attainment of maximum wiping efficiency under wiping conditions ordinarily encountered.

Since the notches extend through to the back portion down to the hinge, longitudinal stresses of compression or tension which occur during bending of the wiping element are not transmitted to the hinge and therefore do not interfere with the lateral movement of the hinge in permitting layover of wiping portion 24, thus diminishing any tendency of wiping portion 24 or wiping edge 28 to twist.

The characteristics above described as better adapting the present invention to use on wrap-around windshields also contributes substantially to better conformity of the blade with the glass, and therefore to better wiping results, even on curved windshields wherein the curvature is not compounded, and on flat windshields, which invariably have low spots sometimes difficult for the ordinary blade to reach and wipe clean.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper blade comprising an elongate resilient wiping member and a support means carried thereon, said blade including a back portion and a wiping portion having a wiping edge adapted to contact a windshield for wiping it, said support means being generally planar and adapted to prevent movement in said plane while resiliently permitting relatively free movement in a plane normal to the first-mentioned plane and toward said wiping edge in response to pressure applied thereto, said support means having generally uninterrupted parallel inner edges extending substantially throughout the length thereof, said back portion being provided with transverse notches substantially throughout its length to define a series of relatively movable vertebra, longitudinal grooves provided on opposite sides of said vertebrae for slidably receiving the uninterrupted parallel inner edges of said support means, said vertebrae having broadened bases adjacent each other for distributing evenly to said wiping edge forces which are transmitted thereto from said support means.

2. The structure of claim 1 wherein the notches are V-shaped.

References Cited

UNITED STATES PATENTS

| | | | |
|---|---|---|---|
| 2,966,692 | 1/1961 | Zaiger | 15—250.36 |
| 3,089,174 | 5/1963 | Bignon | 15—250.36 |

FOREIGN PATENTS 629,612  12/1961  Italy.

CHARLES A. WILLMUTH, *Primary Examiner.*